(12) United States Patent
Murata

(10) Patent No.: US 8,185,919 B2
(45) Date of Patent: May 22, 2012

(54) OPTICAL DISK DEVICE WITH A PRECISE EJECTION POSITION OF A DISK TRAY

(75) Inventor: Tatsuya Murata, Tokorozawa (JP)

(73) Assignee: TEAC Corporation, Tokyo (JP)

( * ) Notice: Subject to any disclaimer, the term of this patent is extended or adjusted under 35 U.S.C. 154(b) by 327 days.

(21) Appl. No.: 12/535,633

(22) Filed: Aug. 4, 2009

(65) Prior Publication Data

US 2010/0037246 A1    Feb. 11, 2010

(30) Foreign Application Priority Data

Aug. 7, 2008  (JP) ................................ 2008-203725

(51) Int. Cl.
*G11B 17/04* (2006.01)

(52) U.S. Cl. ........................................ 720/602; 720/606

(58) Field of Classification Search .................. 720/602, 720/600, 606, 601
See application file for complete search history.

(56) References Cited

U.S. PATENT DOCUMENTS

| | | | |
|---|---|---|---|
| 6,496,463 B1 * | 12/2002 | Ogawa et al. ................. | 720/606 |
| 6,498,774 B2 * | 12/2002 | Kang et al. .................... | 720/610 |
| 7,143,422 B2 * | 11/2006 | Bae ................................ | 720/601 |
| 7,411,871 B2 * | 8/2008 | Lee et al. .................... | 369/30.27 |
| 7,492,674 B2 * | 2/2009 | Kimura et al. ............. | 369/30.36 |
| 2001/0019526 A1 | 9/2001 | Takeda | |
| 2003/0223323 A1 | 12/2003 | Osawa | |
| 2005/0052959 A1 | 3/2005 | Chang | |
| 2005/0201215 A1 * | 9/2005 | Hsu et al. .................... | 369/30.27 |
| 2010/0050192 A1 * | 2/2010 | Ito et al. ........................ | 720/601 |
| 2010/0333121 A1 * | 12/2010 | Ho ................................ | 720/606 |

FOREIGN PATENT DOCUMENTS

| | | |
|---|---|---|
| JP | 2-144159 U | 12/1990 |
| JP | 2001-216702 A | 8/2001 |
| JP | 2003-281806 A | 10/2003 |
| JP | 2003-346408 A | 12/2003 |
| JP | 2008-34030 A | 2/2008 |

OTHER PUBLICATIONS

Office Action, for corresponding German Application No. 10 2009 026 330.6-55, mailed Feb. 3, 2011, 6 pages, with partial English Translation.
Japanese Office Action for corresponding JP Application No. 2008-203725 with English translation, mailed Mar. 13, 2012, 4 pages.

* cited by examiner

*Primary Examiner* — Brian Miller
(74) *Attorney, Agent, or Firm* — Seed IP Law Group PLLC

(57) ABSTRACT

An optical disk device which highly precisely positions a disk tray in an ejection position is provided. A controller of an optical disk device drives the disk tray from a storage position toward an exposed position. When a position immediately before the ejection position is detected by a detecting switch, the velocity is reduced, to allow the disk tray to contact a mechanical stopper, for positioning. The controller measures a movement time to the position immediately before the ejection position, and adjusts the drive voltage to increase or decrease the drive voltage for contact with the mechanical stopper according to the measured time.

3 Claims, 4 Drawing Sheets

OPTICAL DISK DEVICE WITH A PRECISE EJECTION POSITION OF A DISK TRAY

PRIORITY INFORMATION

This application claims priority to Japanese Patent Application No. 2008-203725, filed on Aug. 7, 2008, which is incorporated herein by reference in its entirety.

BACKGROUND

1. Technical Field

The present invention relates to an optical disk device, and in particular to movement of a disk tray.

2. Related Art

Conventionally, a technique is proposed for adjusting a movement velocity of a disk tray. JP 2-144159 U discloses a technique wherein an actual movement time between an ejected position and stored position of a disk tray is measured, and an information signal for correcting a movement time of the disk tray is output to a disk tray driving motor controller based on a comparison result between the measured actual movement time and a movement reference time.

JP 2001-216702 A discloses that, when a preset movement velocity of a placement tray cannot be obtained when the placement tray is slid, an instruction signal for suitably correcting the applied voltage to the output motor is output from a calculator to a drive power supply. JP 2003-281806 A discloses that a loading time or an ejection time of a disk tray is measured, and when the disk tray loading time or the disk tray ejection time is not within a predetermined range, the motor is controlled so that the drive voltage of the loading motor is changed, and the disk tray loading time or the disk tray ejection time is within the predetermined range. JP 2008-34030 A discloses that a time from pressing of an open switch of a disk tray to a time when a switch which detects that the disk tray is opened is switched OFF is measured, and when the switch is not switched OFF within a certain time period from start of the open/close operation of the disk tray, it is judged that dust or the like is adhered to the moving unit and the open/close operation of the disk tray is slow or stopped, and the drive voltage applied to the motor is increased.

In a processing system or the like which automatically transports an optical disk to an optical disk device, the disk tray must be highly precisely positioned, in order to reliably place the optical disk on the disk tray. If the position of the disk tray is unstable, the optical disk may deviate from the disk tray or ejection becomes difficult. In order to improve the position precision of the disk tray, there is known a method in which the disk tray is moved until the disk tray contacts a mechanical stopper, when the disk tray is to be ejected.

In general, in a disk tray type loading mechanism, switches are provided which detect a loading completion position (close position) and ejection completion position (open position), respectively. When ejection is detected by the switch, the disk tray is stopped. When the disk tray collides with the mechanical stopper, a failure such as a boss fracture may occur due to the shock, and thus the disk tray is controlled so that a suitable margin is provided from the switching ON of the switch to the mechanical stopper, to avoid collision with the mechanical stopper. However, because there is a variation in the position where the switch is switched ON or in the actual distance the disk tray travels after the switch is switched ON, the positional precision of the disk tray is not high. Therefore, the disk tray is intentionally brought into contact with the mechanical stopper, to secure positional precision. In order to prevent failure due to collision with the mechanical stopper, the disk tray is driven at a relatively slow velocity from the time when the switch is switched ON to the time when the disk tray contacts the mechanical stopper.

However, when the frictional force of the disk tray changes or the power supply voltage of the device changes due to deterioration with time, the movement velocity of the disk tray would vary even when the disk tray is driven in the same manner. In some cases, the disk tray may stop in the middle without contacting the mechanical stopper, and thus there is a problem in that the positional precision of the disk tray cannot be secured.

SUMMARY

The present invention advantageously provides a device which can secure positional precision of the disk tray.

According to one aspect of the present invention, there is provided an optical disk device comprising a disk tray which transports an optical disk, a driving unit which drives the disk tray between a storage position and an exposed position, wherein the driving unit drives the disk tray with a first driving profile from the storage position to a predetermined position immediately before the exposed position, and with a second driving profile which has a relatively lower velocity than the first driving profile from the position immediately before the exposed position to the exposed position, and a controller which compares, with a reference time, a time when the disk tray is driven with the first driving profile from the storage position to the position immediately before the exposed position, and adjusts the second driving profile according to a comparison result.

According to another aspect of the present invention, it is preferable that, in the optical disk device, the controller adjusts the second driving profile to increase the second driving profile when the time when the disk tray is driven with the first driving profile from the storage position to the position immediately before the exposed position is longer than the reference time, and adjusts the second driving profile to reduce the second driving profile when the time when the disk tray is driven with the first driving profile from the storage position to the position immediately before the exposed position is shorter than the reference time.

According to various aspects of the present invention, it is possible to reliably move and position the disk tray to the exposed position with a suitable velocity, regardless of deterioration of the disk tray with time.

The present invention will be more clearly understood based on the following description of a preferred embodiment. The preferred embodiment, however, is provided merely for exemplary purposes, and the scope of the present invention is not limited to the preferred embodiment.

DETAILED DESCRIPTION

A preferred embodiment of the present invention will now be described with reference to the drawings.

Figure 1:
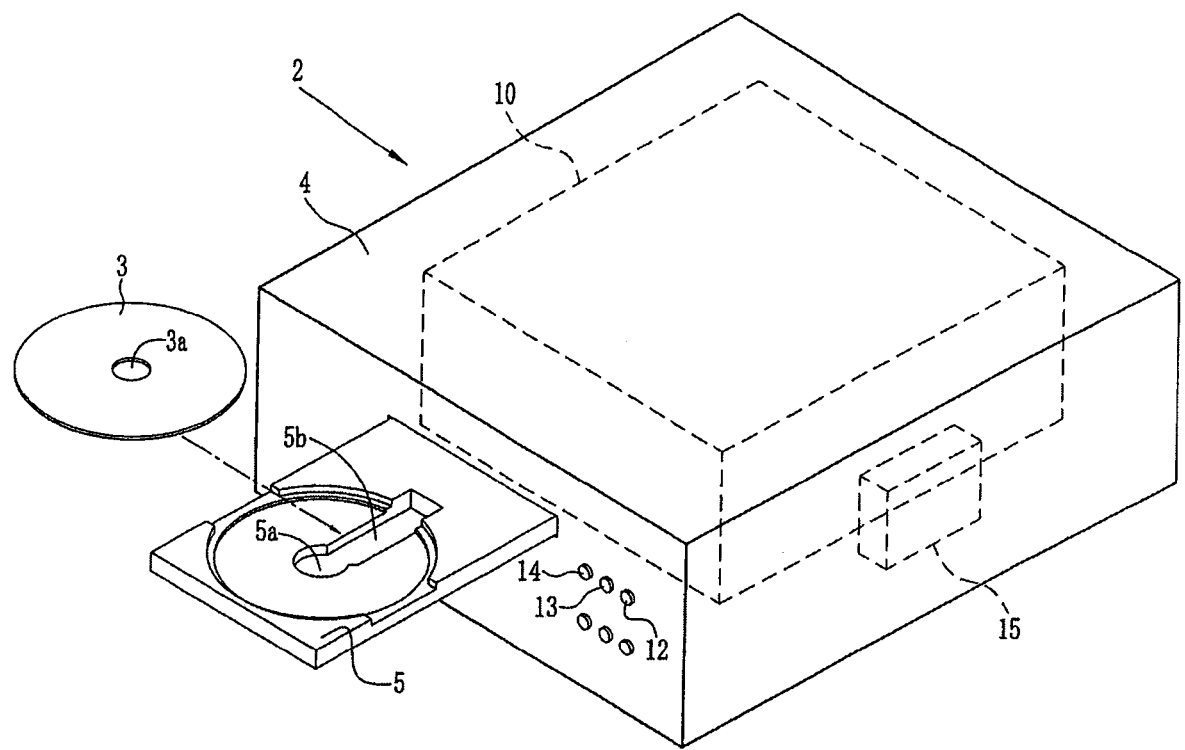
FIG. 1 is an overview of an optical disk device.

FIG. 1 shows an overview of an optical disk device 2 according to a preferred embodiment of the present invention. A mechanical unit 10 including a disk tray 5, an optical pickup, a pickup base, a spindle motor, and a turntable, and a circuit board, are assembled in a case 4 of an optical disk device 2. Various switches, including a replay switch 12 for starting replay of an optical disk 3, a stop switch 13 for stopping replay of the optical disk 3, and an open/close switch 14 for opening/closing the disk tray 5, are provided on a front surface of the case 4. These switches including the open/close switch 14 are connected to a controller 15 which executes primary control of the optical disk device 2.

The disk tray 5 is provided to be movable between a loading position (storage position) where the optical disk 3 is loaded in the case 4 when the optical disk 3 is recorded or replayed, and an ejection position (exposed position) where the optical disk 3 is exposed to the outside of the case 4, and is moved by a tray moving mechanism. When the disk tray 5 is to be moved, the controller 15 receiving a command from an external system actuates the tray moving mechanism or the user manually operates the open/close switch 14 to actuate the tray moving mechanism. A recess corresponding to an outer size of the optical disk 3 is formed in the disk tray 5. At a center portion of the disk tray 5, a through hole 5a through which the spindle motor and the turntable are inserted when the disk tray is positioned at the loading position is formed, and an access opening 5b for allowing the optical pickup to access the optical disk 3 is formed connecting to the through hole 5a.

Figure 2:
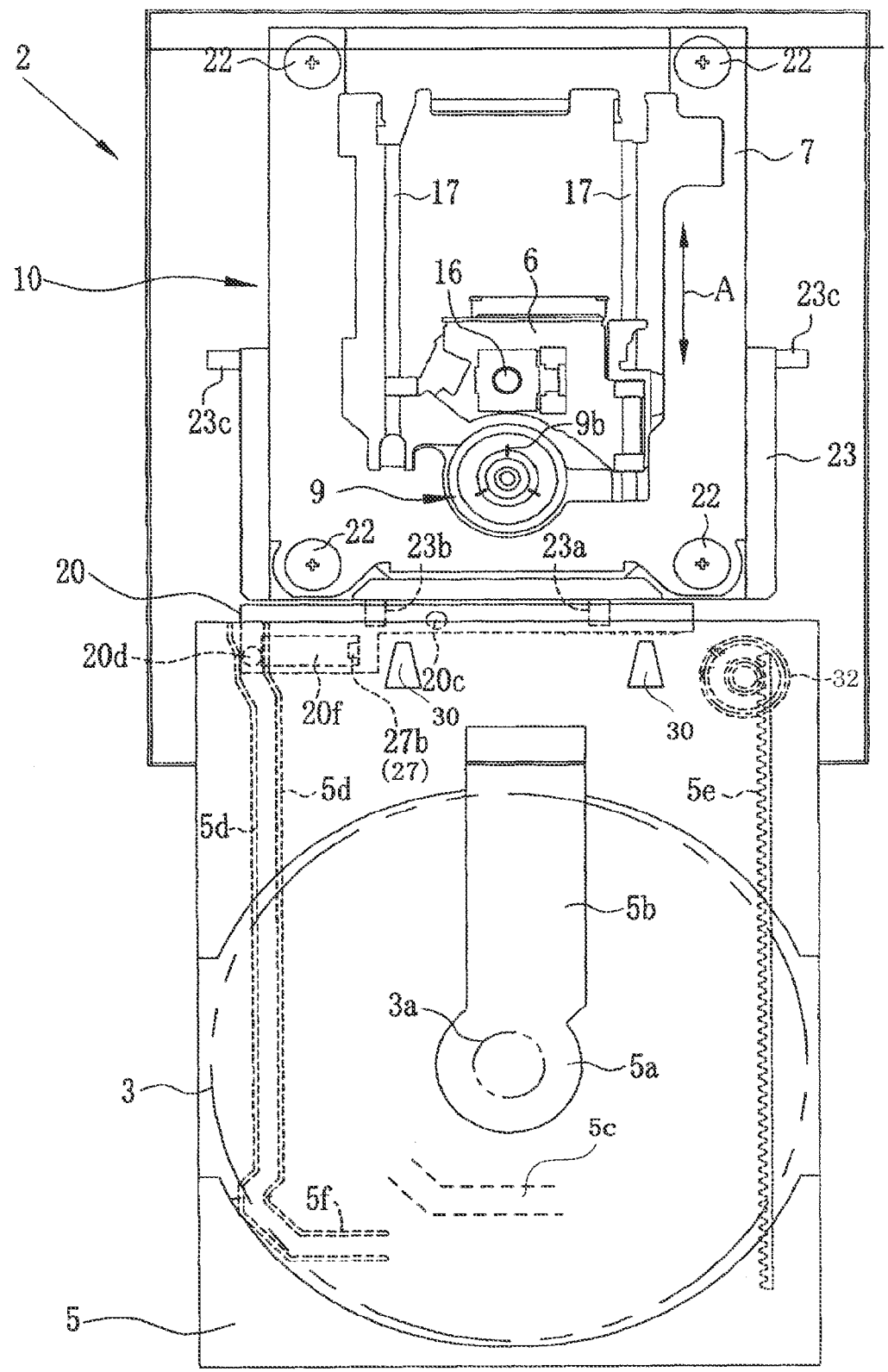
FIG. 2 is a plan view of an optical disk device.
Figure 3:
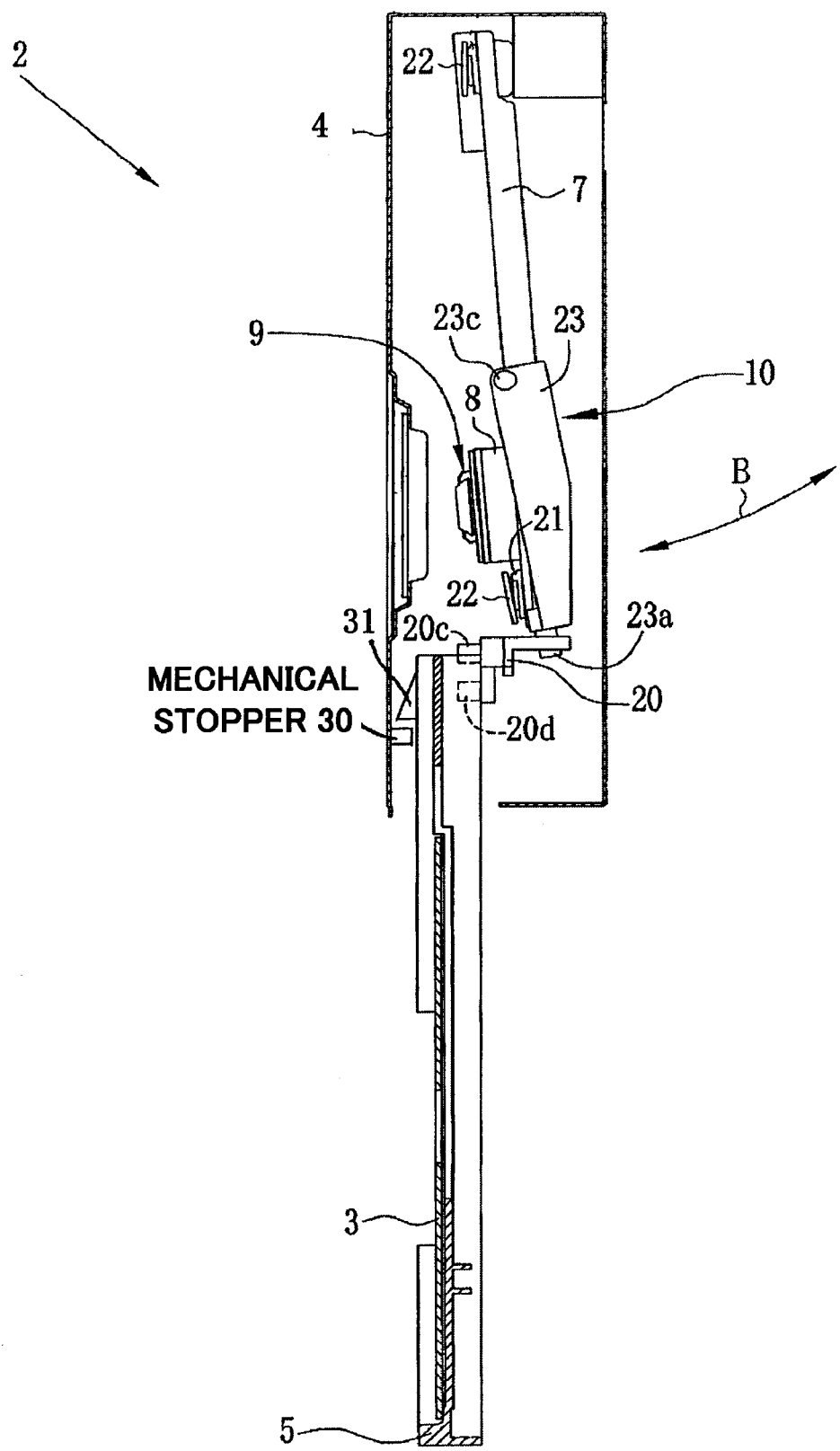
FIG. 3 is a side view of an optical disk device.

FIGS. 2 and 3 show a structure of the optical disk device 2. The optical pickup 6 comprises an objective lens 16 which focuses laser light irradiated from a semiconductor laser to a recording surface of the optical disk 3 and is held in a movable manner on a holding shaft 17 mounted on the pickup base 7. The optical pickup 6 is driven in an axial direction of the holding shaft 17 which is a radial direction of the optical disk 3.

The turn table 9 is mounted on a rotation shaft of the spindle motor 8. On an upper surface of the turntable 9, a chucking core section is formed. The chucking core section is provided to fit with the center hole 3a of the optical disk 3 and hold the optical disk 3. In the chucking core section, positioning ribs 9b for holding and positioning the optical disk 3 are formed in a radially protruding manner separated from each other by a pitch of 120°.

In the inside of the case 4, a slider 20 for rotating the mechanical unit 10 is provided. The slider 20 is provided to be slidable in the left and right directions, and the mechanical unit 10 rotates according to the sliding of the slider 20. On a lower surface of the disk tray 5, a first guide rib 5c for guiding a first slider boss 20c of the slider 20, and a second guide rib 5d for guiding a second slider boss 20d are provided. Two guide ribs 5c and two guide ribs 5d are formed, and the bosses 20c and 20d are configured to be inserted between two ribs. With this structure, when the disk tray 5 moves in the forward and backward directions, the bosses 20c and 20d are guided by the guide ribs 5c and 5d in the left and right directions, and the slider 20 slides in the left and right directions.

On the pickup base 7, four dampers are mounted with screws 22. Two screws 22 at the back surface side are screwed to a mounting section inside the case 4 through the damper, and the pickup base 7 is rotatably mounted with the two screws 22 as the center. Two screws 22 on the front surface side are mounted to a rotation base 23 through a damper. On the front surface of the rotation base 23, a first base boss 23a which is inserted into a first guide hole of the slider 20 and a second base boss 23b which is inserted into a second guide hole are formed. A rotational axis 23c is formed on left and right side surfaces of the rotation base 23, and is provided to be rotatable inside the case 4. A switch insertion hole 20f, through which a switch piece 27b of a rotatable position detecting switch 27 is inserted, is formed on the slider 20.

When the slider 20 is slid in the left direction to a left-slide position, the switch piece 27b is pressed by the slider 20, and the position detecting switch 27 is rotated to a left-switch-ON position. On the other hand, when the slider 20 is slid in the right direction to the right switch position, the switch piece 27b is pressed by the slider 20 and the position detecting switch 27 is rotated to a right-switch-ON position. The position detecting switch 27 is connected to the controller 15, and outputs a signal corresponding to the position to the controller 15. The position detecting switch 27 is urged by a spring to switch toward a switch-OFF position which is a vertical state. When the disk tray 5 is positioned at the ejection position (exposed position), the second slider boss 20d is guided by the second guide rib 5d, and the slider 20 is positioned at the left-slide position. When the disk tray 5 is moved from the ejection position (exposed position) toward the loading position (storage position), the second slider boss 20d is guided by the second guide rib 5d, and the slider 20 slides from the left-slide position toward the right. When the slider 20 slides from the left-slide position toward the right, the position detecting switch 27 rotates due to the urging of the spring to switch from the left switch-ON position toward the switch-OFF position. In addition, at a front end of the second guide rib 5d of the disk tray 5, a guide section 5f for sliding the slider 20 in the right direction to the right-slide position, to rotate the position detecting switch 27 to the right-switch-ON position, is formed. Therefore, when the disk tray 5 reaches the loading position (storage position), the position detecting switch 27 rotates to the right-switch-ON position.

The mechanical stopper 30 is formed, for example, in a protruding manner on an internal surface near the opening of the case 4, and an engagement protrusion 31 formed on an end of the disk tray 5 collides with the protruding section. The position of the mechanical stopper 30 is formed further to the rear end side than a curved section formed on a rear end section of the second guide rib 5d. FIG. 2 shows a configuration where the second slider boss 20d is positioned at the curved section of the second guide rib 5d and the position detecting switch 27 is at the left-switch-ON position, and the mechanical stopper 30 is formed at a position where the disk tray 5 further moves in the ejection direction and the engagement protrusion collides. The distance from the position detecting switch 27, being at the left switch-ON position, to the contact with the mechanical stopper 30 is arbitrarily set as a margin. Therefore, when the disk tray 5 moves from the loading position (storage position) in the ejection direction, first, the position detecting switch 27 rotates to the left switch-ON position, to detect that the disk tray has reached a position immediately before the ejection position (exposed position), then the engagement protrusion 31 of the disk tray 5 contacts the mechanical stopper 30, and finally the disk tray 5 reaches the ejection position (exposed position).

A tray moving mechanism for moving the disk tray 5 is provided in the case 4. The tray moving mechanism comprises a gear 32 for the tray and a motor (not shown). The gear 32 for the tray engages a tray gear 5e formed on the disk tray 5. The motor is connected to the controller 15, and with driving of the motor the tray gear 32 rotates and the disk tray 5 moves in the forward and backward directions. The movement velocity of the disk tray 5 is adjusted by the controller 15 controlling the driving velocity of the motor.

In the present embodiment, a configuration is employed in which the mechanical unit 10 is rotated by the slider 20. However, this configuration is not a necessary configuration, and the mechanical unit 10 may be fixed and configured to not rotate.

In addition, in the present embodiment, a position where the position detecting switch 27 outputs the left-switch-ON signal is set as the position immediately before the ejection position (exposed position) and a position where the position detecting switch 27 outputs the right-switch-ON signal is set as the loading position (storage position). Alternatively, it is also possible to employ a configuration wherein the position immediately before the ejection position, and the loading position, are detected by separate detecting switches and the signals are output to the controller 15.

Figure 4:
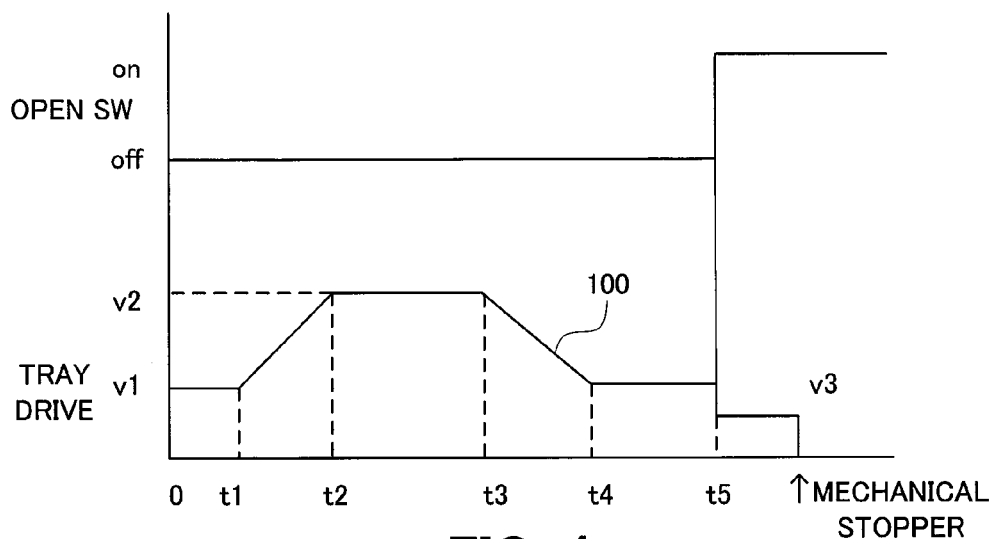
FIG. 4 is a diagram for explaining basic driving profile.

FIG. 4 shows a basic driving profile 100 when the controller 15 moves the disk tray 5. The driving profile 100 is a profile when the disk tray 5 is driven from the loading position to the ejection position. The horizontal axis represents time and the vertical axis represents a drive voltage. From start to time t1, the disk tray 5 is moved with a velocity v1, the disk tray 5 is gradually accelerated from time t1 to time t2 to a velocity v2, the disk tray 5 moves with the velocity v2 from time t2 to time t3, the disk tray 5 is gradually decelerated from time t3 to time t4, and the disk tray moves with the velocity v1 from time t4 to time t5. When the position detecting switch 27 is at the left switch-ON (switching ON of the open switch) at time t5, the velocity is reduced from v1 to v3 (wherein v3<v1), and the disk tray 5 contacts the mechanical stopper 30. The profile from time 0 to time t5 is the first driving profile, and the profile from time t5 to the contact with the mechanical stopper is the second driving profile. However, as has already been described, with such a driving profile, when the frictional force of the disk tray 5 is changed or the power supply voltage is changed due to deterioration with time, a problem may occur in that the disk tray 5 stops before reaching the mechanical stopper 30 or collides with the mechanical stopper 30 at a high velocity. In consideration of this, in the present embodiment, the controller 15 evaluates the deterioration with time of the disk tray 5 in the following manner, and switches the driving profile according to an evaluation result.

Specifically, when the frictional force of the disk tray 5 or the power supply voltage changes, the movement velocity of the disk tray 5 also changes. When the frictional force of the disk tray 5 is increased, the movement velocity is reduced, and when the power supply voltage is increased, the movement velocity is increased. Therefore, the controller 15 measures a time period from the start of driving from the loading position toward the ejection position to the detection of the left switch-ON by the position detecting switch 27, to evaluate the status of the disk tray 5. More specifically, if the time when the disk tray 5 is operated under a standard situation is ts and the time obtained through the measurement is tm, when tm>ts, it is possible to evaluate that the frictional force of the disk tray 5 has been increased and the disk tray 5 tends to not move, and when tm<ts, it is possible to evaluate that the power supply voltage has been increased and the disk tray 5 is moving with a high velocity. When tm>ts, the drive voltage of the motor is adjusted so that the velocity after the detection of the left-switch-ON by the position detecting switch 27 is increased, and when tm<ts, on the other hand, the drive voltage of the motor is adjusted so that the velocity after the detection of the left-switch-ON by the position detecting switch 27 is reduced.

Figure 5:
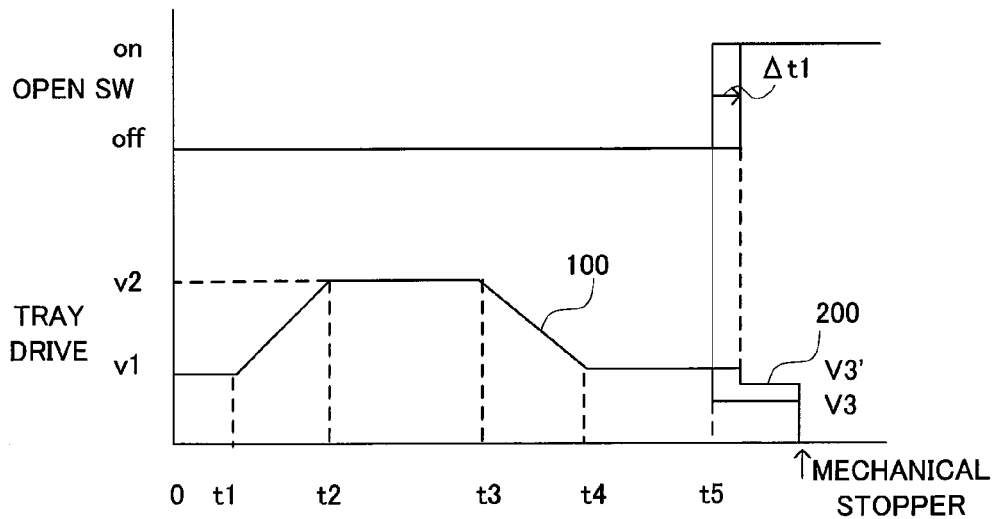
FIG. 5 is a diagram for explaining the driving profile when tm>ts.

FIG. 5 shows a driving profile 200 when tm>ts. Because tm>ts, the position detecting switch 27 is not set to the left switch-ON at time t5 as in FIG. 4, but rather, is set to the left switch-ON at time t5+Δt1. Because the frictional force of the disk tray 5 is increased, the movement velocity of the disk tray 5 is reduced even with the same drive voltage. The controller 15 does not reduce the drive voltage after the position detecting switch 27 is switched ON as in the driving profile 100 of FIG. 4, but rather, drives the disk tray 5 with a greater drive voltage v3' to increase and adjust the velocity, and allows the disk tray 5 to contact the mechanical stopper 30.

Figure 6:
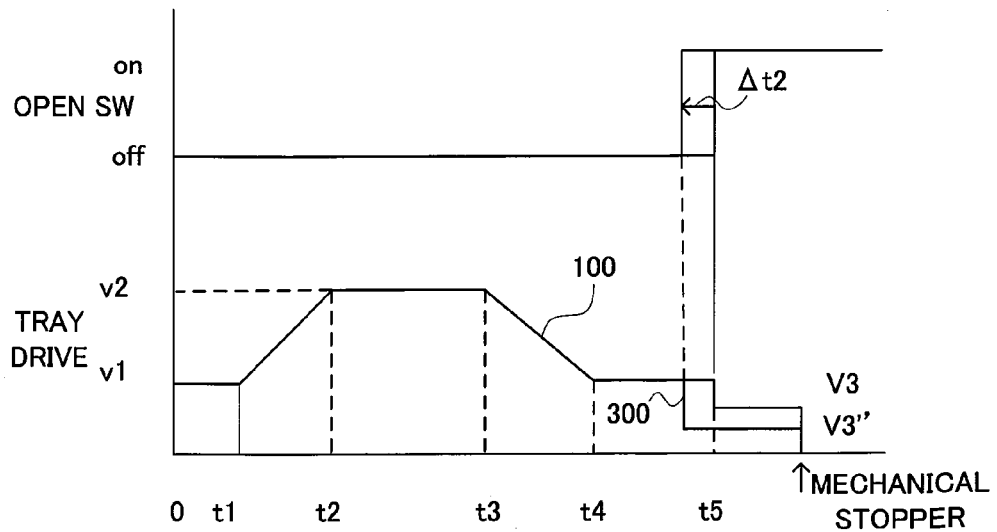
FIG. 6 is a diagram for explaining the driving profile when tm<ts.

FIG. 6 shows a driving profile 300 when tm<ts. Because tm<ts, the position detecting switch 27 is not set to the left switch-ON at time t5 as in FIG. 4, but rather, is set to the left switch-ON at time t5−Δt2. Because the power supply voltage is increased, the movement velocity of the disk tray 5 is increased. The controller 15 does not reduce the driving voltage after the position detecting switch 27 is switched ON as in the driving profile 100 of FIG. 4, but rather, drives the disk tray 5 with a lower drive voltage v3", to reduce and adjust the velocity, and allows the disk tray 5 to contact the mechanical stopper 30.

As shown in FIGS. 5 and 6, the status of the disk tray 5 is evaluated based on the time from the start of the driving from the loading position toward the ejection position to the switching ON of the position detecting switch 27, and the drive voltage for driving the disk tray 5 to contact the mechanical stopper 30 is adjusted according to the evaluation result. Because of this configuration, it is possible to maintain the velocity of movement toward the mechanical stopper 30 at v3 regardless of the deterioration with time, to reliably allow contact of the disk tray 5 with the mechanical stopper 30, and to highly precisely position the disk tray 5. In FIGS. 5 and 6, the amount of adjustment of the drive voltage can be arbitrarily set. It is desirable to set the amount of adjustment based on the relationship between tm and ts. For example, when the drive voltage from the switching ON of the position detecting switch 27 to the contact with the mechanical stopper 30 is Vd, the adjusted driving voltage may be calculated by Vd×tm/ts. Alternatively, other calculation equations may be used. For example, with a coefficient α, the adjusted drive voltage may be set to Vd+α(tm−ts). In other words, it is only necessary that the drive voltage be increased to increase the movement velocity of the disk tray 5 when tm>ts, and the drive voltage be reduced to reduce the movement velocity of the disk tray 5 when tm<ts. When tm=ts, the drive voltage does not need be adjusted.

When tm and ts are compared, an allowance range may be provided. In other words, when |tm−ts|<ε (wherein ε is a constant), it is possible to assume that substantially, tm=ts, and the drive voltage may be maintained without any adjustment.

In addition to being incorporated in a personal computer or the like, the optical disk device of the present embodiment may be incorporated in an optical disk processing system which comprises a printing unit which prints an image or a text on a label surface of the optical disk 3. The optical disk processing system has the optical disk device as a recording unit, has the printing unit and the recording unit, and sequentially takes optical disks out from a stocker and transports the optical disks with a transporting mechanism to the recording unit and the printing unit. Data is recorded on the recording surface of the optical disk in the recording unit, and then the optical disk is transported to the printing unit where an image or text is printed on the label surface. The optical disk 3 to which the data is recorded and the printing on the label surface is completed is again transported to the stocker. In the present embodiment, because the disk tray 5 can be brought into contact with the mechanical stopper 30 and highly precisely positioned, it is possible to accurately place the optical disk 3 on the disk tray 5 even in the case where the optical disk is sequentially transported to the disk tray 5 by the transporting mechanism in the optical disk processing system.

What is claimed is:

1. An optical disc device comprising:
   a disk tray which transports an optical disk;
   a position detecting switch which detects a position of the disk tray;
   a stopper which positions the disk tray at an exposed position;
   a driving unit which drives the disk tray between a storage position and the exposed position, wherein the driving unit drives the disk tray with a first driving profile from the storage position to a position immediately before the exposed position at which the position detecting switch is switched ON, and with a second driving profile which has a relatively lower velocity than the first driving profile from the position immediately before the exposed position to the exposed position at which the disk tray contacts the stopper; and
   a controller which compares, with a reference time, a time when the disk tray is driven with the first driving profile from the storage position to the position immediately before the exposed position, and adjusts the second driving profile according to a comparison result.

2. The optical disk device according to claim 1, wherein the controller adjusts the second driving profile to increase the second driving profile when the time when the disk tray is driven with the first driving profile from the storage position to the position immediately before the exposed position is longer than the reference time, and adjusts the second driving profile to reduce the second driving profile when the time when the disk tray is driven with the first driving profile from the storage position to the position immediately before the exposed position is shorter than the reference time.

3. The optical disk device according to claim 2, wherein the controller adjusts the second driving profile using $Vd \times tm/ts$ when a drive voltage by the second driving profile is $Vd$, the time when the disk tray is driven with the first driving profile from the storage position to the position immediately before the exposed position is $tm$, and the reference time is $ts$.

\* \* \* \* \*